Sept. 13, 1949.  H. PECK  2,481,864
AIR PRESSURE INDICATOR
Filed May 9, 1947  2 Sheets-Sheet 1

Inventor
HENRY PECK
By McMorrow, Berman & Davidson
Attorney

Sept. 13, 1949.  H. PECK  2,481,864
AIR PRESSURE INDICATOR
Filed May 9, 1947  2 Sheets-Sheet 2
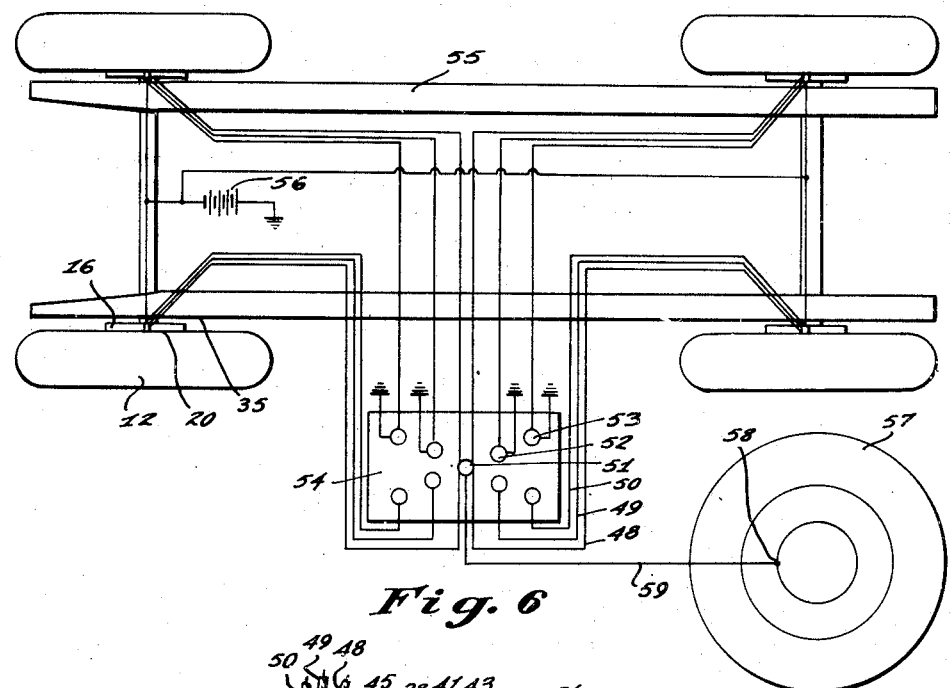
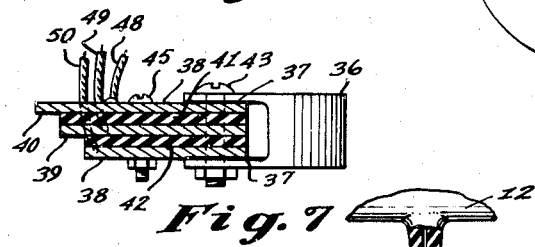
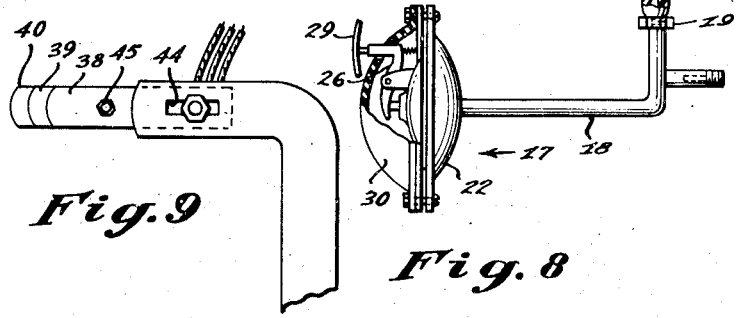
INVENTOR.
HENRY PECK
BY
McMorrow, Berman & Davidson
ATTORNEYS Patented Sept. 13, 1949

2,481,864

UNITED STATES PATENT OFFICE 2,481,864

AIR PRESSURE INDICATOR

Henry Peck, Rockwall, Tex.

Application May 9, 1947, Serial No. 746,928

1 Claim. (Cl. 200—58)

This invention relates to an air pressure indicator, and more particularly to such a device for application to vehicle tires to indicate the air pressure therein.

A primary object of this invention is the provision of an improved indicator adapted to be associated with a panel on the dashboard of a vehicle, which will indicate visually any decrease in pressure in any of the tires of the vehicle, further indicating by means of vari-colored lights the degree of pressure decrease as well as the particular tire affected.

A further object of the invention is the provision of such a device which may be readily applied to any vehicle wheel with a minimum of difficulty.

Still another object of the invention is the provision of such a device so located that the tire associated therewith may be readily changed without the necessity of removing the indicator.

Still another object of the invention is the provision of such a device which may be readily adjusted to a variety of tire pressures within a wide pressure range.

Still other objects reside in the combinations of elements, arrangements of parts, and features of construction, all as will be more fully pointed out hereinafter, and disclosed in the accompanying drawings, wherein there is shown a preferred embodiment of this inventive concept.

In the drawings:

Figure 6 is a diagrammatic view disclosing the wiring arrangement of the indicator relative to the panel on the dashboard.

Figure 7 is a fragmentary vertical sectional view of the fixed contact mechanism.

Figure 8 is a view partially in section and partially in elevation disclosing an apparatus similar to that shown in Figure 3 in modified form.

Figure 9 is a top plan view of the contact mechanism disclosed in Figure 7.

Similar reference characters refer to similar parts throughout the several views of the drawings.

Figure 1:
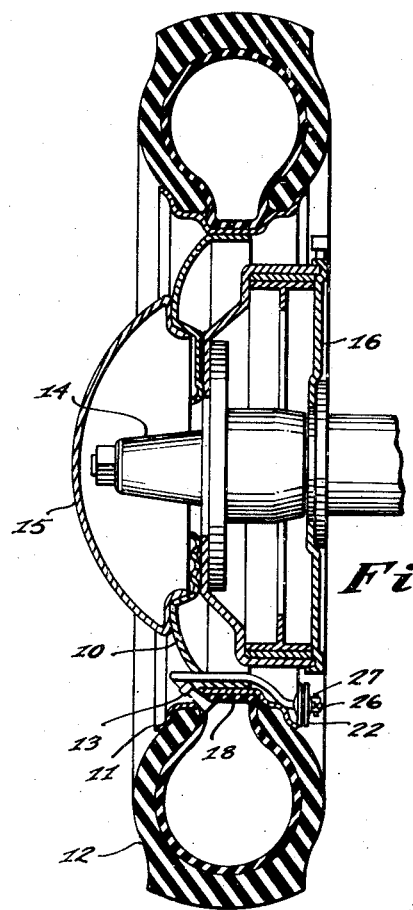
Figure 1 is a vertical sectional view taken through a tire and wheel disclosing the relative positions of features of the instant invention.
Figure 2:
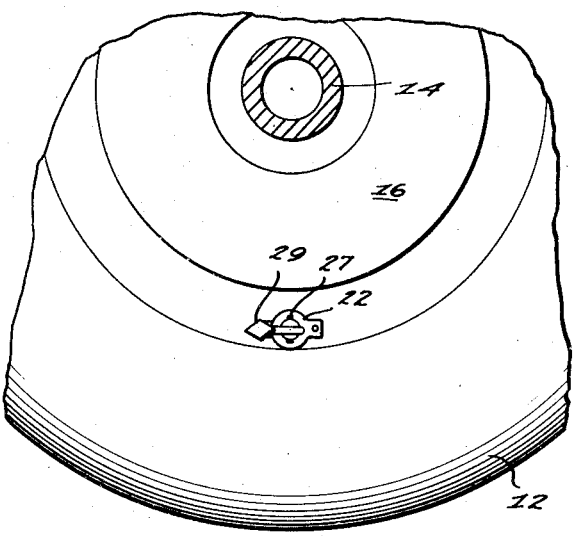
Figure 2 is a fragmentary elevational view of a wheel and tire taken from the inside disclosing the location of one of the elements of the device.
Figure 3:
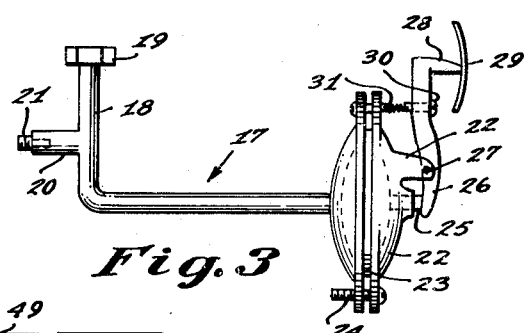
Figure 3 is a side elevational view of the device adapted to be attached to the valve stem, including a movable arm, the position of which is controlled by tire pressure.

Referring now to the drawings in detail, and more particularly to Figure 1, there is shown at 10 a vehicle wheel, provided with the customary rim 11 and tire 12, the latter being provided with a valve stem 13. The mounting of the wheel is conventional, including an axle 14, hub cap 15, and brake drum 16.

One feature of the instant invention comprises a device generally indicated at 17 adapted to be attached to the valve stem 13 of each tire, and includes a tubular member 18, provided with a nut 19 for attachment to the valve stem, a branch tube 20 being provided and including a valve assembly 20' to be utilized for filling the tire in the conventional manner while the device is attached to the valve stem. The tube 18 extends to a housing comprised of two separable halves 21 and 22, between which is positioned a flexible diaphragm 23, suitable bolts 24 being utilized to hold the parts in related assembly. On the side of the diaphragm opposite the tube 18 a piston rod 25 is secured to the diaphragm and movable thereby in accordance with the pressure in the opposite side of the housing, which is equal to the pressure of a tire. The end of the piston rod 25 abuts an end of a lever 26 suitably pivoted, as at 27, to lugs 28 projecting from the housing 23. The opposite end of the lever terminates in a right angled portion 26', provided with an arcuate contact shoe 29, the purpose of which will be more fully described hereinafter. An adjusting screw 30 secured to a tension spring 31 is provided, whereby the relative movement of the shoe 29 may be adjusted to accommodate different pressures within different types of tires. It will be readily apparent that upon a drop in pressure within the tire, the shoe 29 is moved outwardly relative to the housing 22, for a purpose to be more fully described hereinafter.

Figure 8 shows a modified form of construction substantially identical to the device 17 previously described, and including a housing 22, a pivoted lever 26, and a shoe 29, the distinction residing in the provision of a rubber boot 30 of hemisperical configuration secured to the outer side of the housing 22, to protect the mechanism, In this figure the device is shown as attached to the valve stem 13 by means of a nut 19.

Figures 4, 5:
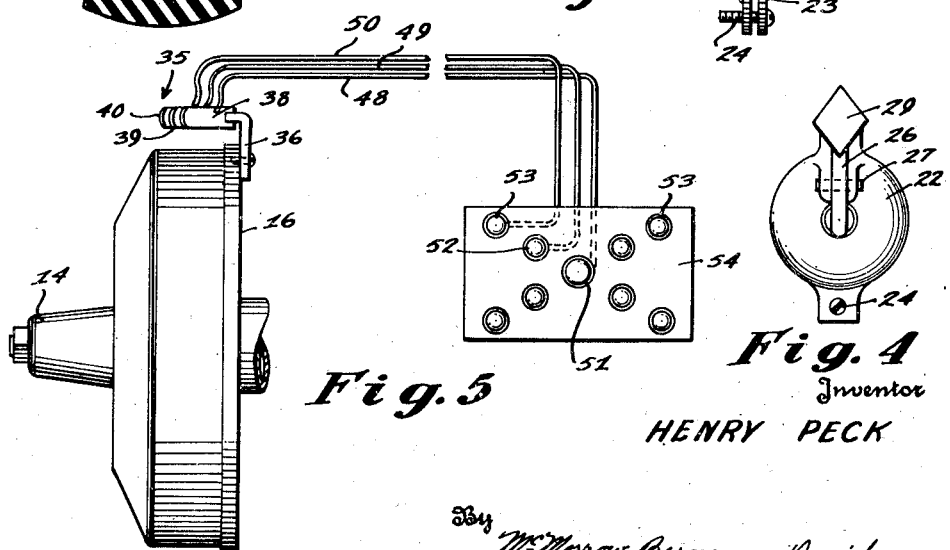
Figure 4 is a view taken substantially at right angles to Figure 3.
Figure 5 is a fragmentary partially schematic view disclosing the fixed contact adapted to be engaged by the device of Figure 3 in association with a vehicle hub, and disclosing the arrangement of lights on the instrument panel of the vehicle.

The shoe 29 is adapted to engage, when extended by decrease of pressure in the tire 12, a fixed switch 35, carried, as best shown in Figure 5, by a mounting bracket 36 suitably secured in any desired manner to a fixed portion of the hub 16. As best shown in Figure 7, bracket 36 includes a bifurcated extremity, the interior of the bifurcations being provided with insulating material 37, and between which are positioned three metallic contacts 38, 39 and 40, insulating strips 41 and 42 being provided between the contacts. A bolt 43 is adapted to pass through a slotted aperture 44 in the bifurcations of bracket 36, to permit relative adjustment of the contact points toward and away from the path of travel of shoe 29. A second bolt 45 is adapted to hold the contacts and their associated insulating material in related assembly.

From each of contacts 38, 39 and 40 wires 48, 49 and 50, respectively, lead to lights 51, 52 and 53 carried by an instrument panel 54 preferably located on the dashboard of a vehicle. The light 51 is centrally positioned on the panel and is preferably red in color. Four lights 52 are provided surrounding the central light 51, and are preferably yellow, while the outer four lights 53, in alignment with lights 52, are preferably green.

It is to be understood that each wheel is provided with an actuating device 17 and a switch mechanism 35.

Each of the contacts 38 is connected directly with the central red light 51, while each of the contacts 39 is connected to one of the yellow lights 52, the relative position of the light being indicative of the wheel with which the particular switch is associated. Correspondingly, each contact 40 is connected to one of the green lights 53, the positions being similar.

Figure 6 discloses diagrammatically the arrangement of the panel 54 in conjunction with each of the four switch mechanisms 35, a vehicle frame being indicated at 55, and provided with a battery 56, the wiring connections being largely conventional, and the arrangement being such that contact of the shoe 29 with a contact 40 will serve to illuminate the associated light 53.

In the operation of the device the arrangement is such that reduction of pressure in a particular tire by an amount of, illustratively, two pounds, will cause forward movement of the shoe 29, in the manner previously described, in such manner that in rotation of the associated wheel the contact 40 will be brushed. This will cause intermittent illumination of the light 53 indicating that the pressure is approximately two pounds below normal. In the event the pressure continues to decline, the shoe 29 will be further extended until contacts 39 and 40 are simultaneously brushed thereby, thus causing intermittent flickering illumination of green light 53 and the associated yellow light 52. A further drop in pressure will cause contact 38 to be engaged, thus intermittently illuminating the red light 51, simultaneously with the associated yellow and green lights 52 and 53, indicative of the particular wheel in which the pressure drop occurs. Means may be provided for indicating a serious drop in pressure in the spare tire 57, and may take the form of a contact member similar to the member 17 fixed to the spare wheel, and juxtaposed to a single contact point 58 of any desired conventional type, connected as by a wire 59 directly to the light 51.

From the foregoing it will now be seen that there is herein provided an improved air pressure indicator which will indicate not only the particular tire in which a pressure drop occurs, but also the degree of such drop on a conveniently located instrument panel in such manner as to immediately call the operator's attention to the decrease in pressure, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A switch for use with a pneumatic tired wheel of an automobile, comprising an air pressure responsive device mounted upon the wheel for rotation therewith, the device comprising a housing including separate housing sections one of which is provided with a central aperture, a resilient diaphragm clamped between the separate housing sections, a plunger slidably mounted in the aperture in said one housing section and extending into the housing and connected to said diaphragm, a lever pivotally mounted intermediate its length upon the housing section carrying the plunger and having one end engaging the outer end of the plunger, a curved electrical contact shoe carried by the opposite end of the lever, a spring engaging the housing and lever to maintain the lever in engagement with the plunger, a tubular fitting connecting the other housing section and the valve stem of the tire upon the wheel and serving to place the space at the corresponding side of said diaphragm in communication with the air pressure in the tire, and a stationary contact assembly mounted upon the automobile and arranged in the path of travel of the contact shoe for contacting the shoe when the wheel rotates, said stationary contact assembly including a plurality of superimposed contact elements electrically insulated from each other and successively engaged by said contact shoe in response to decreasing air pressure acting on said diaphragm.

HENRY PECK.

REFERENCES CITED

The following references are of record in the file of this patent:

UNITED STATES PATENTS

| Number | Name | Date |
|---|---|---|
| 885,121 | Winter | Apr. 21, 1908 |
| 1,115,022 | Quick | Oct. 27, 1914 |
| 1,648,825 | Roth | Nov. 8, 1927 |
| 2,037,016 | Fator | Apr. 14, 1936 |
| 2,308,372 | Krantz | Jan. 12, 1943 |
| 2,347,541 | Crister et al. | Apr. 25, 1944 |
| 2,417,940 | Lehman | Mar. 25, 1947 |